United States Patent Office 3,388,112
Patented June 11, 1968

3,388,112
ACTH ACTIVE PEPTIDES MODIFIED AT THE N-TERMINAL POSITION
Rudolf Geiger and Karl Sturm, Frankfurt am Main, and Walter Siedel, Bad Soden, Taunus, Germany, assignors to Farbwerke Hoechst Aktiengesellschaft vormals Meister Lucius & Brüning, Frankfurt am Main, Germany, a corporation of Germany
No Drawing. Filed Aug. 11, 1964, Ser. No. 388,920
Claims priority, application Germany, Aug. 16, 1963, F 40,493
2 Claims. (Cl. 260—112.5)

ABSTRACT OF THE DISCLOSURE

The compounds:

(I)   $\text{CH}_3$
      |
   $\text{NH}_2\text{-CH-CO-Tyr-Ser-Met-Glu-His-Phe-Arg-Try-Gly-Lys-}$
   $\text{Pro-Val-Gly-Lys-Lys-Arg-Arg-Pro-Val-Lys-Val-Tyr-NH}_2$ (II)  $\text{CH}_3$
      |
   $\text{NH}_2\text{-CH-CO-Tyr-Ser-Met-Glu-His-Phe-Arg-Try-Gly-Lys-}$
   $\text{Pro-Val-Gly-Lys-Lys-Arg-Pro-Val-Lys-Val-Tyr-Pro-NH}_2$ The present invention relates to adrenocorticotropically active tricosa- and tetracosa-peptides and to a process for preparing them.

It is known that acetylation of the free amino group of the serine[1] in amino terminal position in the molecule of natural corticotropin (ACTH) eliminates the corticotropic action [Waller and Dixon, Biochem. J., 75, 320 (1960)]. Periodate degradation of the serine in the corticotropin molecule leads to the ineffective glyoxylyl[1] corticotropin [Geschwind and Li, Biochem. Biophys. Acta 15, 442 et seq. (1954)]. It was concluded therefrom that a free amino group is necessary at the serine[1] in amino terminal position for the action of corticotropin [Waller and Dixon, Biochem. Jan., 75, 320 (1960)]. Dixon and Weitkamp (5. Abstr. Int. Congr. Biochem. Moskau, 1961, section 13, No. 31, p. 253) converted glyoxylyl[1]-corticotropin by transamination by means of glutamic acid into glycine[1]-corticotropin which still exhibits a certain corticotropic action. Contradictory indications have been made in the relevant literature about the strength of said action and about the relation between corticotropic action and extraglandular action.

On the other hand it is known that peptides possessing the sequences between 1 to 20 and 1 to 24 of the amino acids of corticotropin are effective like natural corticotropin.

In the chemistry of peptides many methods are possible for forming peptide linkages. It is, however, not advisable to select any one of the known methods for preparing certain peptides, above all those of high molecular weight. For the synthesis of these peptides, the optimal reaction conditions, which are often the only successful ones, must be detected anew for each case.

It has, now, been found that adrenocorticotropically active tricosa- and tetracosa-peptides of the general Formula I R
|
$\text{NH}_2\text{-CH-CO-Tyr-Ser-Met-Glu-His-Phe-Arg-Try-Gly-}$
$\text{Lys-Pro-Val-Gly-Lys-Lys-Arg-Arg-Pro-Val-Lys-}$
$\text{Val-X-NH}_2$     (I)

in which the abbreviations represent the corresponding amino acids in L-configuration, R stands for hydrogen or methyl, isopropyl, 1-methylpropyl, 2-methylpropyl, methyl-hydroxymethylene or benzyl-hydroxymethylene, and X represents Tyr or Tyr-Pro, are obtained by reacting a decapeptide of the general Formula II

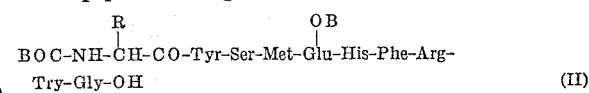

Try-Gly-OH     (II)

in which R has the meaning given above, BOC represents the tertiary butyloxycarbonyl group, and B stands for the tertiary butyl group, with an alkyl chloroformate to form the mixed anhydride of the decapeptide II with the alkyl chloroformate, and then condensing the mixed anhydride with a peptide of Formula III

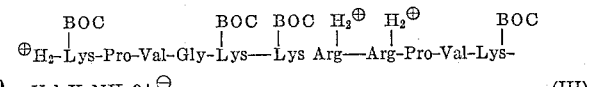

Val-X-NH$_2$,3A$^\ominus$     (III)

in which A$^\ominus$ represents an anion and X has the meaning given above. Other embodiments proceed by condensing the decapeptide of Formula II with the trideca- or tetradeca-peptide of Formula III in the presence of dicyclohexylcarbodiimide, or by condensing the decapeptide of Formula II with the peptide of Formula III by means of dicyclohexylcarbodiimide in the presence of nitrophenol, or by reacting a decapeptide-p-nitrophenyl ester of Formula IIa

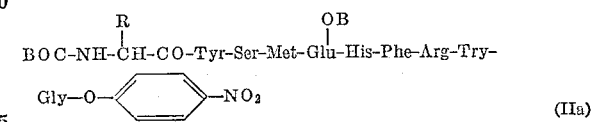

(IIa)

with a trideca- or tetradeca-peptide of Formula III. In each case the protective groups are split off in an acid medium after the condensations.

For carrying out the first method of operation which consists in the use of mixed anhydrides, alkyl chloroformates of low molecular weight can advantageously be used. The mixed anhydride of the formula

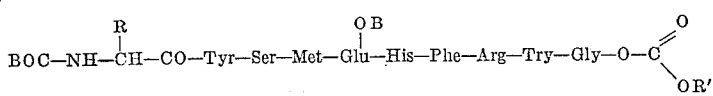

in which R' represents an aliphatic alkyl radical of low molecular weight, is condensed in the presence of an inert solvent, for example dimethylformamide, with the peptide of Formula III. If in compound III, A$^\ominus$ is the anion of a strong acid, 1 equivalent of a base, particularly of an organic tertiary base, such as triethylamine, must be added.

For carrying out the second method of operation the decapeptide derivative of the general Formula II, which carries the protective groups, is condensed with the peptide of the general Formula III in an anhydrous inert solvent by means of cyclohexylcarbodiimide. As solvents, heterocyclic tertiary organic bases or mixtures thereof and/or aliphatic carboxylic acid amides of low molecular weight and mixtures thereof are particularly suitable. It is, for example, possible to operate in pyridine, dimethylformamide or mixtures thereof. In view of the presence of dicyclohexylcarbodiimide (DCC) A$^\ominus$ must not be the anion of a carboxylic acid in Compound III. The reaction temperatures are between 0 and 50° C., advantageously at room temperature. The duration of the reaction depends on the temperature used. In general it is several days, about 1–5 days. The minimum quantities of DCC are 3 equivalents, and it is preferable to use 3–5 mols of DCC for 1 mol each of II or III. For working up the crude product carrying the protective groups, the product is precipitated by means of ethyl acetate, ethers or mixtures thereof.

The process in which the condensation with DCC is carried out in the presence of nitrophenol is, however, of particular advantage. The reaction conditions correspond to those indicated for the reaction with DCC alone. 1–2 mols of p-nitrophenol are preferably used, but it is also possible to use smaller quantities, since the nitrophenol is regenerated by aminolysis. According to this method of operation the p-nitrophenyl ester of the decapeptide II of Formula IIa

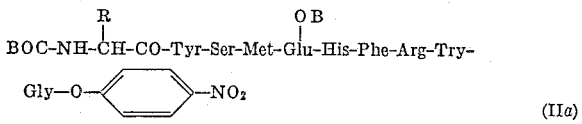

(IIa)

is formed as an intermediate, but it is not isolated.

It is, however, also possible to isolate the nitrophenyl ester IIa. This ester is formed by the condensation of II in the form of a salt of a strong acid—but not of a carboxylic acid—with p-nitrophenol in one of the aforementioned solvents by means of DCC. If excess nitrophenol is used, the nitrophenol itself can act as salt component and the formation of salt with another acid becomes unnecessary. The ester IIa is precipitated by the addition of ether. The nitrophenyl ester thus prepared is reacted in the second reaction stage with the tridecapeptide or tetradecapeptide III. In Compound III, $A^\ominus$ can be in this case an anion of any acid. If $A^\ominus$ is the anion of a strong acid, one equivalent of a base must be added.

For reacting the ester with Compound III the aforementioned solvents are used. According to this method it is of particular advantage to use imidazole. The reaction takes place even at 0° C. or at room temperature, but it is also possible to use higher temperatures, for example about 40–100° C. Also in this case the duration of the reaction is shortened with rising temperatures.

The primary reaction products, still carrying protective groups, and having Formula Ia

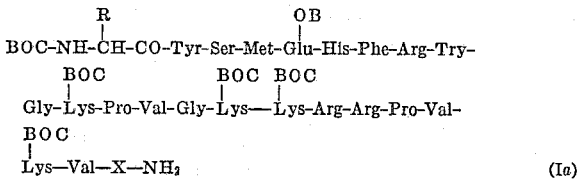

(Ia)

in which BOC represents the tertiary butyloxycarbonyl group, B stands for the tertiary butyl group, R represents hydrogen or methyl, isopropyl, 1-methylpropyl, 2-methylpropyl, methyl-hydroxymethylene or benzyl-hydroxymethylene and X stands for Tyr or Tyr—Pro, are digested with an ammonium acetate/acetic acid buffer solution of pH 3.0–4.0 or, if a complete recovery of the starting substances is desired, they are subjected to chromatography with Sephadex with the same ammonium acetate/acetic acid buffer solution.

The purified condensation product is subsequently separated from the protective groups in an acid medium, advantageously in the presence of trifluoro acetic acid.

For preparing the tricosa-or tetracosa-peptides of Formula I, the nitrophenol methods which until now have not been applied for preparing peptides of the type of corticotropin are particularly suitable. According to these 2 methods, the formation of side products is distinctly reduced in comparison with other methods of operation. Of the two aforementioned methods, the one-step process without isolation of the nitrophenyl ester is to be preferred. The excess of DCC according to this method promotes regeneration of the nitrophenyl ester hydrolyzed by water, which is always present and which can practically not be removed completely, and the regenerated nitrophenyl ester can be used again for the condensation with the peptide III. The crude reaction product contains then only small quantities of starting products, which facilitates the purification of the products of the invention.

The ACTH activity of the new tricosapeptides and tetracosapeptides thus obtained, for example of the compounds of Formula I, in which R represents a hydrogen atom, is about 40 international units per milligram if a digestion has been carried out with an ammonium acetate/acetic acid buffer solution. If the compounds have been subjected to chromatography with Sephadex, the ACTH activity is about 70 international units per milligram. By further chromatography with carboxymethyl cellulose the activity can be increased to more than 100 international units per milligram (subcutaneous test on rats according to the third international working standard). The products obtained according to the process of the present invention can, therefore, be used as valuable therapeutics, for example in the treatment of disorders of the hypophysis, generally allergic reactions and disorders of the hematopoietic system.

The following examples serve to illustrate the invention, but they are not intended to limit it thereto.

Preparation of tricosapeptide BOC—Gly—Tyr—Ser—Met—Glu—(OG)—His—Phe—Arg—Try—Gly—Lys(BOC)—Pro—Val—Gly—Lys—(BOC)—Lys—(BOC)—Arg—Arg—Pro—Val—Lys(BOC)—Val—Tyr—NH$_2$

EXAMPLE 1

(a) 2.15 grams of BOC-decapeptide II are dried in a high vacuum for 2 hours at 60° C. together with 4.0 grams of tridecapeptide amide trihydrochloride [obtained according to Chemische Berichte 96, page 609, (1963)]. 25 cc. of anhydrous pyridine and 0.83 gram of DCC are added, the whole is stirred for 4 days at room temperature, and the mixture solidifies slowly to form a jelly. By adding 250 cc. of peroxide-free ether, the crude reaction product is precipitated. It is then washed with acetone and ether and dried under reduced pressure. The yield is 5.67 grams.

(b) The same quantities of starting material and DCC as described in Example 1 are used, and the reaction is carried out in 20 cc. of dimethylformamide and 0.265 cc. of triethylamine as solvents. The crude yield is 5.52 g.

EXAMPLE 2

2.5 grams of the acetate of BOC-decapeptide of the Formula II are converted by lyophilization by means of 0.25 gram of triethylamine hydrochloride into 2.25 grams of acetate-free hydrochloride. The latter is dissolved with 0.4 gram of 4-nitrophenol in 15 cc. of dimethylformamide. After adding a solution of 0.9 gram of DCC in 9 cc. of pyridine (or dimethylformamide), the whole is allowed to stand for 24 hours at room temperature. The decapeptide-nitrophenyl ester (IIa) is then precipitated by means of ether. The precipitate is washed with ethyl acetate and ether and dried under reduced pressure over phosphorus pentoxide. There are obtained 2.3 grams of decapeptide-nitrophenyl ester which are stirred for 4 days at room temperature in 30 cc. of anhydrous pyridine together with 4.3 grams of tridecapeptide-triacetate, then dried for 2 hours at 60° C. in a high vacuum. (The same results are obtained by a heating for 3 hours at 80° C.) By adding 300 cc. of a mixture of ethyl acetate/ether=2:1 to the reaction mixture, the crude reaction product is precipitated. After filtering, it is washed with ethyl acetate and ether and dried under reduced pressure. The yield is 6.0 grams.

EXAMPLE 3

1.5 grams of BOC-decapeptide II and 2.2 grams of tridecapeptide amide trihydrochloride are dried for 2 hours at 60° C. in a high vacuum over phosphorus pentoxide. The mixture is then dissolved in 24 cc. of absolute pyridine, 280 milligrams of p-nitrophenol and 830 milligrams of dicyclohexylcarbodiimide are added, the whole is stirred for 5 days at room temperature, and the reaction product is precipitated by the addition of ether. Yield: 3.6 grams.

Preparation of tetracosapeptide
BOC—Gly—Tyr—Ser—Met—Glu(OB)—His—Phe—Arg—Try—Gly—Lys—(BOC)—Pro—Val—Gly—Lys(BOC)—Lys(BOC)—Arg—Arg—Pro—Val—Lys(BOC)—Val—Tyr—Pro—NH₂

EXAMPLE 4

2.15 grams of BOC-decapeptide II are treated with 4.2 grams of tetradecapeptide amide trihydrochloride [obtained according to Chemische Berichte 96, page 609, (1963)] as described in Example 1a. The yield of tetracosapeptide is 5.78 grams.

EXAMPLE 5

2.3 grams of the decapeptide-nitrophenyl ester obtained according to Example 2 are treated as described in Example 2 with 4.5 grams of tetradecapeptide triacetate. There are obtained 6.1 grams of tetracosapeptide.

EXAMPLE 6

1.5 grams of BOC-decapeptide II and 2.3 grams of tetradecapeptide amide trihydrochloride are dried for 2 hours at 60° C. in a high vacuum over phosphorus pentoxide. The mixture is then dissolved in 24 cc. of absolute pyridine, 280 milligrams of p-nitrophenol and 830 milligrams of dicyclohexylcarbodiimide are added, the whole is stirred for 5 hours at room temperature, and the reaction product is precipitated by the addition of ether. Yield 3.65 grams.

Purification of the products obtained according to the process of the present invention (A) 10 grams of the crude tricosapeptides or tetracosapeptides are triturated in a twentyfold quantity of 1 N-ammonium acetate/acetic acid buffer solution having a pH-value of 3.5. The suspension is filtered, and the residue is dried in the air. There are obtained for example, 8.1 grams of tricosapeptide of Formula I. 1.6 grams of tridecapeptide amide can be recovered by lyophilizing the filtrate.

(B) 100 grams of Sephadex G-25 medium of Messrs. Pharmacia, Uppsala, are allowed to swell overnight in 2 liters of a buffer solution containing 10 cc. of acetic acid and 3 grams of ammonium acetate per liter of water. The gel is then placed in a glass column having a diameter of 1.6 cm. and a height of 200 cm. 1 gram of crude tricosapeptide or tetracosapeptide is dissolved in 4 cc. of dimethylformamide, the solution is diluted with 4 cc. of the buffer solution in which the Sephadex was allowed to swell, the clear solution is added to the column and eluted with the same buffer solution. The solution issuing from the column is divided into fractions of 10 cc. each with the aid of an automatic collector. The peptide content of the individual fractions is determined by determining the extinction at 275 or 253 mμ. The respective fractions are combined and lyophilized.

From 1 gram of the crude product prepared according to Example 2 there are obtained in the following sequence:

300 milligrams of tridecapeptide of Formula III
530 milligrams of tricosapeptide of Formula Ia
70 milligrams of decapeptide of Formula II Removal of protective groups 1 gram of the tricosapeptide or tetracosapeptide amide derivatives of Formula Ia, purified according to the aforedescribed methods (A) or (B) are dissolved in 5 cc. of trifluoro acetic acid with the addition of 2 drops of thioglycollic acid or mercaptoethanol. The solution is allowed to stand for one hour at room temperature, 100 cc. of peroxide-free ether are added, the flocculent peptide trifluoroacetate is filtered off and washed with ether. After drying, there are obtained, for example, 955 milligrams of tricosapeptide trifluoroacetate in the form of a yellowish non-hygroscopic powder. The trifluoroacetates are dissolved in water and converted into acetates by filtering them through a short column of Amberlite IRA-400-acetate. If a high degree of purity is desired, the products obtained according to the process of the present invention can be subjected to chromatography with carboxymethyl cellulose.

Preparation of the starting material (a₁) BOC—Gly—Tyr—Ser OCH₃

7.6 grams of BOC—Gly—OH and 5.55 cc. of triethylamine are dissolved in 50 cc. of tetrahydrofuran. At 15° C., 5.15 cc. of isobutyl chloroformate are added dropwise while stirring. At 15° C., the cooled solution of 14.3 grams of H—Tyr—Ser—OCH₃ in 50 cc. of tetrahydrofuran is added, and stirring is continued for a further 2 hours, the temperature being allowed to rise slowly to 15–20° C. The solution is then evaporated under reduced pressure, the residue is taken up in moist ethyl acetate, shaken successively with ice-cold 1 N-citric acid solution, 1 N-bicarbonate solution and water and evaporated again under reduced pressure. The remaining tripeptide crystallizes when being triturated with ether. The yield is 13.8 grams. Melting point 117–118° C.; $[\alpha]_D^{20}+9.4°$ (c.=2 in 90% of acetic acid).

In the following modification of the first condensation step the glycine in the peptide is replaced by benzyl serine.

(a₂) BOC—Ser(OBz)—Tyr—Ser—OCH₃

10.6 grams of BOC—O—benzyl serine are dissolved in 80 cc. of tetrahydrofuran with the addition of 5.0 cc. of triethylamine. At 20° C., 4.65 cc. of isobutyl chloroformate are added dropwise while stirring, and after 5 minutes, a solution of 10.2 grams of H—Tyr—Ser—OCH₃ in 40 cc. of tetrahydrofuran is added at 15° C. While stirring, the temperature is allowed to rise to 20° C. within 1 hour, the solution is then evaporated to dryness under reduced pressure, the residue is taken up in moist ethyl acetate and shaken successively with ice-cold 1 N-citric acid solution, 1 N-bicarbonate solution and water, the substance precipitating to a large extent. Together with the substance obtained by evaporating the ethyl acetate phase, there is obtained a crude yield of 18.2 grams. After recrystallization from 50% of methanol and acetonitrile, there are obtained 14.7 grams of pure substance, melting point 120–121° C.; $[\alpha]_D^{20}-9.0°$ (c.=2 in methanol).

The following stages of synthesis correspond to those described for glycine peptide.

(b) BOC—Gly—Tyr—Ser—Met—OCH₃

5.8 grams of tripeptide methyl ester from (a₁) are allowed to stand for 24 hours together with 2.75 cc. of hydrazine hydrate of 80% strength in 40 cc. of methanol, the precipitated hydrazide crystals are pressed off and washed with methanol. After drying under reduced pressure over phosphorus pentoxide, there are obtained 4.6 grams of tripeptide hydrazide melting at 202° C.

2 grams of the aforementioned tripeptide hydrazide are converted with 1.42 grams of H—Met—OCH₃ [according to Helv. Chim. Acta, 44, 169 (1961)] into 1.56 grams of tetrapeptide ester, melting at 181–182° C.

(c) BOC—Gly—Tyr—Ser—Met—Glu—(OB)—His—Phe—Arg—Try—Gly—OH.CH₃COOH 7.8 grams of the tetrapeptide ester, prepared according to (b) are allowed to stand for 24 hours together with 4.7 cc. of hydrazine hydrate of 80% strength in 80 cc. of methanol. The precipitated hydrazide is pressed off, washed with a little methanol and dried under reduced pressure over phosphorus pentoxide. There are obtained 6.2 grams of tetrapeptide hydrazide melting at 208–210° C. (with decomposition).

4.4 grams of the aforementioned tetrapeptide hydrazide are converted into the azide [according to Chem. Ber. 96, 1080 (1963)] and reacted with 5.05 grams of H—Glu—(OB)—His—Phe—Arg—Try—Gly—OH.CH₃COOH in dimethylformamide as solvent and in the presence of 1.0 cc. of triethylamine. After precipitation by means of ethyl acetate, there are obtained 8.2 grams of crude decapeptide II as acetate which is recrystallized from methanol of 80% strength. Yield 5.30 grams, melting point 210° C. (with decomposition) $[\alpha]_D^{20}$—6° (c.=1.5 in dimethylformamide). $R_f$ 0.93 in n-butanol/acetic acid/pyridine/water (30:6:20:24). The compound is chromatographically pure.

We claim:
1. A compound of the formula

CH₃
|
NH₂-CH-CO-Tyr-Ser-Met-Glu-His-Phe-Arg-Try-Gly-Lys-Pro-Val-Gly-Lys-Lys-Arg-Arg-Pro-Val-Lys-Val-Tyr-NH₂

2. A compound of the formula

CH₃
|
NH₂-CH-CO-Tyr-Ser-Met-Glu-His-Phe-Arg-Try-Gly-Lys-Pro-Val-Gly-Lys-Lys-Arg-Arg-Pro-Val-Lys-Val-Tyr-Pro-NH₂

References Cited

UNITED STATES PATENTS

| | | | |
|---|---|---|---|
| 3,164,614 | 1/1965 | Nicolaides et al. | 260—345.8 |
| 3,228,926 | 1/1966 | Kappeler et al. | 260—112.5 |
| 3,259,616 | 7/1966 | Schwyzer et al. | 260—112.5 |
| 3,264,280 | 8/1966 | Hofmann et al. | 260—112.5 |

OTHER REFERENCES

Dixon et al., Biochemical J. 84, 462–468 (1962).
Geiger et al., Z. Naturforschung 196, 858–860 (1964).
Brockmann et al., Naturwissen 49, 540–541 (1962).

ELBERT L. ROBERTS, *Primary Examiner.*

LEWIS GOTTS, *Examiner.*

M. M. KASSENOFF, *Assistant Examiner.*